(12) United States Patent
Reuning

(10) Patent No.: US 6,381,592 B1
(45) Date of Patent: *Apr. 30, 2002

(54) CANDIDATE CHASER

(76) Inventor: Stephen Michael Reuning, 510 Horizon Center, Robbinsville, NJ (US) 08691

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/984,650

(22) Filed: Dec. 3, 1997

(51) Int. Cl.$^7$ ................................................ G06F 17/60

(52) U.S. Cl. ........................... 707/3; 707/10; 707/104; 705/1

(58) Field of Search .............................. 705/1, 7, 8, 9; 707/3, 10, 104; 709/206, 50

(56) References Cited

U.S. PATENT DOCUMENTS

| | | | | |
|---|---|---|---|---|
| 5,164,897 A | * | 11/1992 | Clark et al. .................... | 705/1 |
| 5,197,004 A | * | 3/1993 | Sobotka et al. ................. | 705/1 |
| 5,758,324 A | * | 5/1998 | Hartman et al. ................ | 705/1 |
| 5,832,497 A | * | 11/1998 | Taylor ........................ | 707/104 |
| 5,873,077 A | * | 2/1999 | Kanoh et al. ................... | 707/3 |
| 5,918,207 A | * | 6/1999 | McGovern et al. ............ | 705/1 |
| 5,966,714 A | * | 10/1999 | Huang et al. ................ | 707/201 |
| 5,978,768 A | * | 11/1999 | McGovern et al. ............ | 705/1 |
| 5,978,799 A | * | 11/1999 | Hirsch .......................... | 705/4 |
| 6,006,222 A | * | 12/1999 | Culiss .......................... | 705/5 |
| 6,119,135 A | * | 9/2000 | Helfman ..................... | 707/513 |

FOREIGN PATENT DOCUMENTS

JP     411085844 A  *  9/1997

OTHER PUBLICATIONS

Tim et al "Junk mail extends its reach" Computerworld v29n45 PP: 32; Dialog file: 15, Accession No. 01117542, Nov. 1995.*

Dialog File:484, Accession No. 03529457: Safner "Get Smart: The electronic resume." Career World (ICRW), v26 n2, p28–31, May 1992.*

Dialog File:484, Accession No. 02186415: Joyce Lain "The job search goes computer." Journal of Career Planning & Employment (ICPE), v55 n1, p42–46, Sep. 1994.*

Dialog File, Accession No. 01098347: "Now it's recruiting that's going on–line." Electronic Engineering Times, p. 51+, Jan. 1995.*

(List continued on next page.)

Primary Examiner—Sam Rimell
Assistant Examiner—Romain Jeanty
(74) Attorney, Agent, or Firm—Pharmaceutical Patent Law, LLP

(57) ABSTRACT

The Candidate Chaser machine and method automatically locates Internet site pages and web postings which contain operator specified keywords or Boolean combinations and then extracts all electronic mail addresses from those pages as well as hyper-linked pages to as many linking levels as selected by the operator and then sends a job opportunity description in the form of an electronic mail message to each of the extracted addresses then receives responses from recipients of the job opportunity message then filters those messages by reading their text and forwards only desired responses to the candidate seeking client's electronic mail address thusly sparing the client interaction with large amounts of irrelevant response while presenting viable candidates for a given job opening. It applies a distinctive and non-obvious method for delivering identical electronic mail messages to a group of targeted potential job candidates sharing a specifically desired single or set of common experiences, interests, capabilities, professional titles or talents relating to the needs of the candidate seeking hiring entity and handling their response.

15 Claims, 2 Drawing Sheets

OTHER PUBLICATIONS

Dialog File 15, Accession No. 00984293: Stephenie "Cruising cyberspace for the best recruits." HRMagazine v40n2 PP: 52–55, Feb. 1995.*

Dialog File 146, Accession No. 4103602: Chandrasekaran "Around the Beltway–Tapping Into a Web of Aspirations NetStart Helps Firms With Online Job Hunts." Washington Post, Dec. 1996.*

Dialog File 148, Accession No. 09745857: Dave "Electronic resume submission can be a revealing source." InfroWorld, v19, n38, p74D(1), Sep. 1997.*

Telecomworldwire "I–Search Forms Process and Database Resume Service Deal" Dialog File: 636, Accession No. 03383476, Dec. 1996.*

Levine; "First class E–mail system" Dialog File 47, Accession No. 047879019, Aug. 1997.*

Newsbytes "Net Ferret Application Suite" Dialog File 275, Accession No. 02073327, Jun. 1997.*

5245532 : Electronic mail follow–up system Inventors: Mourier; Yves P., Lagny, FranceAssignees: International Business Machines Corporation, Armonk, NY Contact the IBM Licensing Department for information about this patent Issued: Sep. 14, 1993 Filed: Jun. 12, 1989 Serial No.: 364944 Maint. Status: Intl. Class (Ed. 5): G06F 15/40; G06F 13/00; U.S. Class: 364–400; 395–650; 395–700; Field of Search: 395–650,700 ; Agents: Dillon; Andrew J.; , Attached as Prior Art Document #28 Located on p. 163.

5040141 : Method for administrating reply mail in electronic mail system Inventors: Yazima; Kazunori, Komae, Japan Mizuno; Yasuhiko, Kashiwa, JapanAssignees: Hitachi, Ltd., Tokyo, Japan Issued: Aug. 13, 1991 Filed: Nov. 23, 1987 Serial No.: 123930 Maint. Status: CC Intl. Class (Ed. 5): G06F 13/10; U.S. Class: 364–900; 364–919.5: 364–940.9; 364–937; Field of Search: 364–200 MS File, 900 MS File,300 ; 379–089 ; 340–313,825.06 ;Agents: Fay, Sharpe, Beall, Fagan, Minnich & McKee;, Attached as Prior Art Document #29 Located on page 156.

5632018 : Electronic mail system Inventors: Otorii; Keiichi, Kawasaki, JapanAssignees: Fujitsu Limited, Kanagawa, Japan Issued: May 20, 1997 Filed: Sep. 13, 1993 Serial No.: 120966 Maint. Status:Intl. Class (Ed. 6): G06F 13/00; G06F 13/38; U.S. Class: 395–200.04; 395–200.12; 395–200.16; Field Of Search: 395–200,700,200.03,200.04,200.12,200.16 ; 369–514 ; 364–900,551 ; 379–034 ;, Attached as Prior Art Document #+Located on p. 169.

5408334 : Method and apparatus for having a processor execute a job utilizing an electronic mail system inventors: Yamagishi; Tadashi, Yokohama, JapanIshimaru; Masahiko, Fujisawa, Japan Fujita; Fujio, Yokohama, JapanIchikawa; Yoshikazu, Fujisawa, JapanNamba; Hideki, Hadano, JapanKokunishi; Motohide, Kokubunji, JapanHirano; Michio, Chigasaki, JapanKozuma; Kaoru, Yokosuka, Japan-Hirosawa; Toshio, Machida, JapanItoh; Tutomu, Kanagawa, JapanUeoka; Atsushi, Hachioji, JapanSasaki; Shigeru, Kamakura, Japan Nakamura; Kazuyuki, Tokyo, Japan Assignees: Hitachi, Ltd., Tokyo, Japan Hitachi Software Engineering Co., Ltd., Tokyo, Japan Hitachi Electronics Services Co., Ltd., Tokyo, Japan Issued: Apr. 18, 1995 Filed: Nov. 23, 1993 Serial No.: 155794 Maint. Status: Intl. Class (Ed. 6): HO4M 11/00; U.S. Class: 358–402; 379–088; Field of Search: 358–402–403 ; 379–88,96 ; Agents: Antonelli, Terry, Stout & Kraus; Attached as Prior Art Document #31 Located on p. 172.

5487100 : Electronic mail message delivery system Inventors: Kane; John R., Wellington, FL Assignees: Motorola, Inc., Schaumburg, IL Issued: Jan. 23, 1996 Filed: May 17, 1994 Serial No.: 248853 Maint. Status: Intl. Class (Ed. 6): H04M 11/00; U.S. Class: 379–057; 379–096; 340–825.44; 340–825.07; 340–825.15; 340–825.17; 340–311.1; Field of Search: 379–57,56,96,88,89 ; 340–825.44,311.1,825.07,825.15,825.17,825.27,825.26 ; Agents: Gardner; Kelly A.; Moore; John H.;, Attached as Prior Art Document #32 Located on p. 175.

5613108 : Electronic mail processing system and electronic mail processing method Inventors: Morikawa; Takashi, Nishinomiya, Japan Assignees: Minolta Camera Kabushiki Kaisha, Osaka, Japan Issued: Mar. 18, 1997 Filed: Feb. 18, 1994 Serial No.: 198900 Maint. Status: Intl. Class (Ed. 6): G06F 17/30; U.S. Class: 393–616; 379–093; Field of Search: 395–600 ; 379–093 ; 364–419 ; Agents: Price, Gess & Ubell;, Attached as Prior Art Document #33 Located on p. 179.

NetContact Software, Attached as Prior Art Document #1 Located on p. 1, found at multiple postings on the Internet by Stephen M. Reuning during the month of Oct. 1997, author unknown.

GeoList Software, Attached as Prior Art Document # Located on p. 4, found at multiple postings on the Internet by Stephen M. Reuning during the month of Oct. 1997, author unknown.

DejaVu Software, Attached as Prior Art Document #3 Located on p. 6, found at multiple postings on the Internet by Stephen M. Reuning during the month of October 1997, author unknown.

Sonic Software, Attached as Prior Art Document #4 Located on p. 7, found at multiple postings on the Internet by Stephen M. Reuning during the month of Oct. 1997, author unknown.

Web Collector, Attached as Prior Art Document #5 Located on p. 9, found at multiple postings on the Internet by Stephen M. Reuning during the month of Oct. 1997, author unknown.

Mach10 Software, Attached as Prior Art Document #6 Located on p. 11, found at multiple postings on the Internet by Stephen M. Reuning during the month of Oct. 1997, author unknown.

ExtractorPro Software, Attached as Prior Art Document #7 Located on p. 13, found at multiple postings on the Internet by Stephen M. Reuning during the month of Oct. 1997, author unknown.

High Technology Law Journal vol. 11: Issue 2, Fall 1996 Article Garbage In: Emerging Media and Regulation of Unsolicited Commercial Solicitations, Attached as Prior Art Document #8 Located on p. 15.

Spam Wars: Time to Give Peace a Chance By: Rosalind Resnick Editor and Publisher Digital Direct Marketing Letter, , Attached as Prior Art Document #9 Located on p. 90.

Taming the e–mail monster by Mark Hull Talent Scout Editor, Attached as Prior Art Document #10 Located on p. 93, found at multiple postings on the Internet by Stephen M. Reuning during the month of Oct. 1997.

Bulk E–mailers in search of spam haven By Matthew Broersma Oct. 8, 1997 5:19 PM PDT ZDNN, Attached as Prior Art Document #11 Located on p. 99.

Bulk E-mail Delivery Service, Attached as Prior Art Document #12 Located on p. 102, found at multiple postings on the Internet by Stephen M. Reuning during the month of Oct. 1997, author unknown.

From the Aug. 1997 Issue fo PC World First Class E-Mail By Daniel B. Levine, Attached as Prior Art Document #13 Located on p. 104.

From the Aug. 1997 Issue of PC World Better Browser E-Mail, Attached as Prior Art Document #14 Located on p. 106.

From the Aug. 1997 Issue of PC World Features That Matter, Attached as Prior Art Document #15 Located on p. 108.

From the Aug. 1997 Issue of PC World New Standards to Watch For, Attached as Prior Art Document #16 Located on p. 111.

From the Aug. 1997 Issue of PC World E-Mail Connection 3.1a, Attached as Prior Art Document 190 17 Located on p. 113.

From the Aug. 1997 Issue of PC World Eudora Pro 3.0, Attached as Prior Art Document #18 Located on Page 115.

From the Aug. 1997 Issue of PC World Juno 1.23, Attached as Prior Art Document #19 Located on p. 117.

From the Aug. 1997 Issue of PC World Microsoft Outlook Express, Attached as Prior Art Document #20 Located on p. 119.

From the Aug. 1997 Issue of PC World Netscape Messenger 4.0, Attached as Prior Art Document #21 Located on p. 121.

From the Aug. 1997 Issue of PC World Pegasus Mail 2.53, Attached as Prior Art Document #22 Located on p. 122.

Dearborn, MI—Apr. 23rd, 1997: Worldwide Internet access giant AGIS (Apex Global Information Services, Inc.), Attached as Prior Art Document #23 Located on p. 125.

About the Internet Mail Consortium, Attached as Prior Art Document #24 Located on p. 127 , found at multiple postings on the Internet by Stephen M. Reuning during the month of Oct. 1997, author unknown.

Spam-o-rama Last update: Sep. 13, 1996 What is "spamming"?, Attached as Prior Art Document #25 Located on p. 139.

E-Mail is a Critical Business Application, Attached as Prior Art Document #26 Located on p. 148 , found at multiple postings on the Internet by Stephen M. Reuning during the month of Oct. 1997, author unknown.

Various Search Engines and Tools for your Job or Job Candidate Search Surfing Adventure: , Attached as Prior Art Document #27 Located on p. 161, found at multiple postings on the Internet by Stephen M. Reuning during the month of Oct. 1997, author unknown.

The Internet in Human Resource Management By Rebecca Taylor Fall 1996 located http://weeks.ch.twsu.edu/Fall96StudentPapers/RebeccaTaylor.html, Attached as Prior Art Document #34 Located on p. 181.

Chantal Haas, CPC Managing Partner The Quiet Revolution, Attached as Prior Art Document #35 Located on p. 189.

Source Services, Attached as Prior Art Document #36 Located on p. 192, found at multiple postings on the Internet by Stephen M. Reuning during the month of Oct. 1997, author unknown.

Internet Recruiting Resources, Attached as Prior Art Document #37 Located on p. 194, found at multiple postings on the Internet by Stephen M. Reuning during the month of Oct. 1997, author unknown.

Recruiting in CyberspaceAn Interview with Andrew Barbour, author of Recruiting in Cyberspace: Leveraging the Internet in the Human Resource Function. , Attached as Prior Art Document #38 Located on p. 200.

The Internet's World Wide Web: a Strategic Platform for Employer Communications(by Wayne Burns, Sr. Vice President & Creative Director & Kennon Saari, Technical Support Specialist: Bernard Hodes Advertising (Canada). Special thanks to Mark Hornung, National Creative Director, Bernard Hodes Advertising) , Attached as Prior Art Document π39 Located on p. 206.

Source http://www.psc-cfp.gc.ca/recruit/net5.htm is there a Negative Side to Recuriting on the Internet?, Attached as Prior Art Document #Located on p. 210.

Source http://jan.ucc.nau.edu/~bwp2/recruitn.htm A Guide to Recruiting on the Internet, Attached as Prior Art Document #41 Located on p. 212, author unknown.

Are you sending qualified candidates to your competitors? by Debbie McGrath, President, The CEO Group Inc., Attached as Prior Art Document #42 Located on p. 215.

* cited by examiner

CANDIDATE CHASER

BACKGROUND—FIELD OF INVENTION

This invention relates to the process of recruiting new employees, specifically harvesting email addresses belonging to potential viable candidates from sites and postings searched for and found on the Internet and sending specifically related help wanted advertisements via electronic mail to those addresses then receiving, filtering, sorting and distributing the response.

BACKGROUND—DESCRIPTION OF PRIOR ART

Classified help wanted advertising in print, television and radio media as well as postings of help wanted advertisements on Internet web sites are a common practice. Such mediums for prospecting employment candidates are passive in the context of the candidate seeker's objectives. They require the reaction of a potential job seeker who must be reading a specific periodical, watching or listening to a specific broadcast or visiting a specific internet web site or requested a specific push technology internet broadcast. There are too many job opportunity broadcasts and sites available for any job seeker to peruse even a minor percentage on a timely basis. A candidate seeker could attempt to advertise through every applicable site and medium in order to reach every potential candidate however such a strategy is impractical if not impossible. Even if it were practical or possible the candidate seeker would not reach viable candidates who are not actively searching job opportunity advertising sites. The United States Federal Government predicts demand for technical labor in such areas as information technology, sciences, biotechnology and engineering to exceed supply by as much as fifteen percent by the year 2002. In such a situation competitive employers require more aggressive means to prospect employment candidate than the prior mentioned passive methodologies.

Bulk electronic mailing is a common process used to broadcast messages to groups of email addresses collected in databases however the processes used prior to Candidate Chaser are static and the targeting is dependent on pre-assembled databases of email addresses. In such cases where email address lists are procured from a database sources mailers are subject to limited accuracy on two categories: first, are the addresses still active, second, are the individuals interested in receiving email related to the mailers' offerings. Furthermore, the present state of electronic mail address databases does not permit the targeting of addresses based on the individual owner's experiences, interests, capabilities, professional titles or talents.

While bulk electronic mailing is unquestionably legal, there is a powerful lobby opposing general broadcasts of large untargeted and unsolicited bulk electronic mailings which consume huge amounts of internet communication bandwidth causing system delays, increased cost without benefit and mail server failures. Such mailings are broadcast to high quantities, 50,000–200,000 addresses at a time, in the hopes that a fraction, perhaps one tenth of a percent will reach a viable and interested audience. Most of the bandwidth consumption would not be necessary if a more targeted approach was used.

Employers spend over a billion dollars every year in the United States on employment agency fees, classified advertising costs, recruiting staff, the design of recruitment programs and software and referral bonus programs. Many of those employers are large companies that have invested tremendous development resources into solving their recruiting problems and cost reduction yet not a single one of them has created an automated recruiting system like the Candidate Chaser machine and process patented herein. The articles attached and labeled as Prior Art Documents #27, 34, 35, 36, 37, 38, 39, 40, 41 and 42 indicate a recruiting industry searching for internet solutions to recruiting difficulties yet none suggest a solution similar to that presented by the Candidate Chaser machine and process supporting the position of unobviousness relating to the Candidate Chaser machine and process.

Most workers would like to be informed of employment opportunities with quality of life improving advantages including but not limited to compensation increases, advanced training, enhanced benefits, more challenge, diversity and improved career path provided notices of such opportunities were made at the workers' convenience and that workers are not overwhelmed with non-applicable job offerings. Employment agencies and headhunters serve such a purpose but they are prohibitively expensive. No automated and more cost effective alternative was available until the herein described Candidate Chaser was invented.

Present job opportunity advertising systems take days and weeks to reach potential candidates.

While my research indicates no present use of bulk electronic mail for targeted help wanted advertising, use of available bulk email systems would result in "bad address" responses from servers, remove responses, and revenge "flames" from anti-spammers burdening and crashing the advertisers' incoming electronic mail system.

A search of the IBM Patent Server at http://patent.womplex.ibm.com looking for the following words individually in the "abstract" field: recruit, recruiting, hire, hiring, job, candidate, classified, position, bulk, addresses, and recruitment turned up no relevant matching or related patents. A search on the same database for the phrase "electronic mail" turned up no apparently related patents except those patenting the process of sending and receiving electronic mail itself. The patent information and abstract which appear most closely related are attached and labeled as: Prior Art Document #28 U.S. Pat. No. 5,245,532, Prior Art Document #29 U.S. Pat. No. 5,040,141, Prior Art Document #30 U.S. Pat. No. 5,632,018, Prior Art Document #31 U.S. Pat. No. 5,408,334, Prior Art Document #32 U.S. Pat. No. 5,487,100, and Prior Art Document #33 U.S. Pat. No. 5,613,108.

A search for articles and publications discussing "recruiting on the Internet" turned up two hundred forty nine separate documents. While discussing the use of electronic mail for the circulation of resumes and discussion of job possibilities, no reference is ever made to any recruiting solution that even remotely resembles the Candidate Chaser machine and process. I believe this supports the unobviousness of the Candidate Chaser machine as a solution to recruiting difficulties. Those articles which best represent present art on the subject of "recruiting on the Internet" are attached and labeled as Prior Art Documents #27, 34, 35, 36, 37, 38, 39, 40, 41 and 42.

There are a good number of commercially available computer software programs which can perform certain functions of the Candidate Chaser machine. However, none of them alone or in obvious combination accomplish the task of the Candidate Chaser. The said commercially available computer software programs are described in the attached Prior Art Documents #1, 2, 3, 4, 5, 6, 7, 18, 19, 20, 21, and 22.

OBJECTS AND ADVANTAGES

Figure 1:
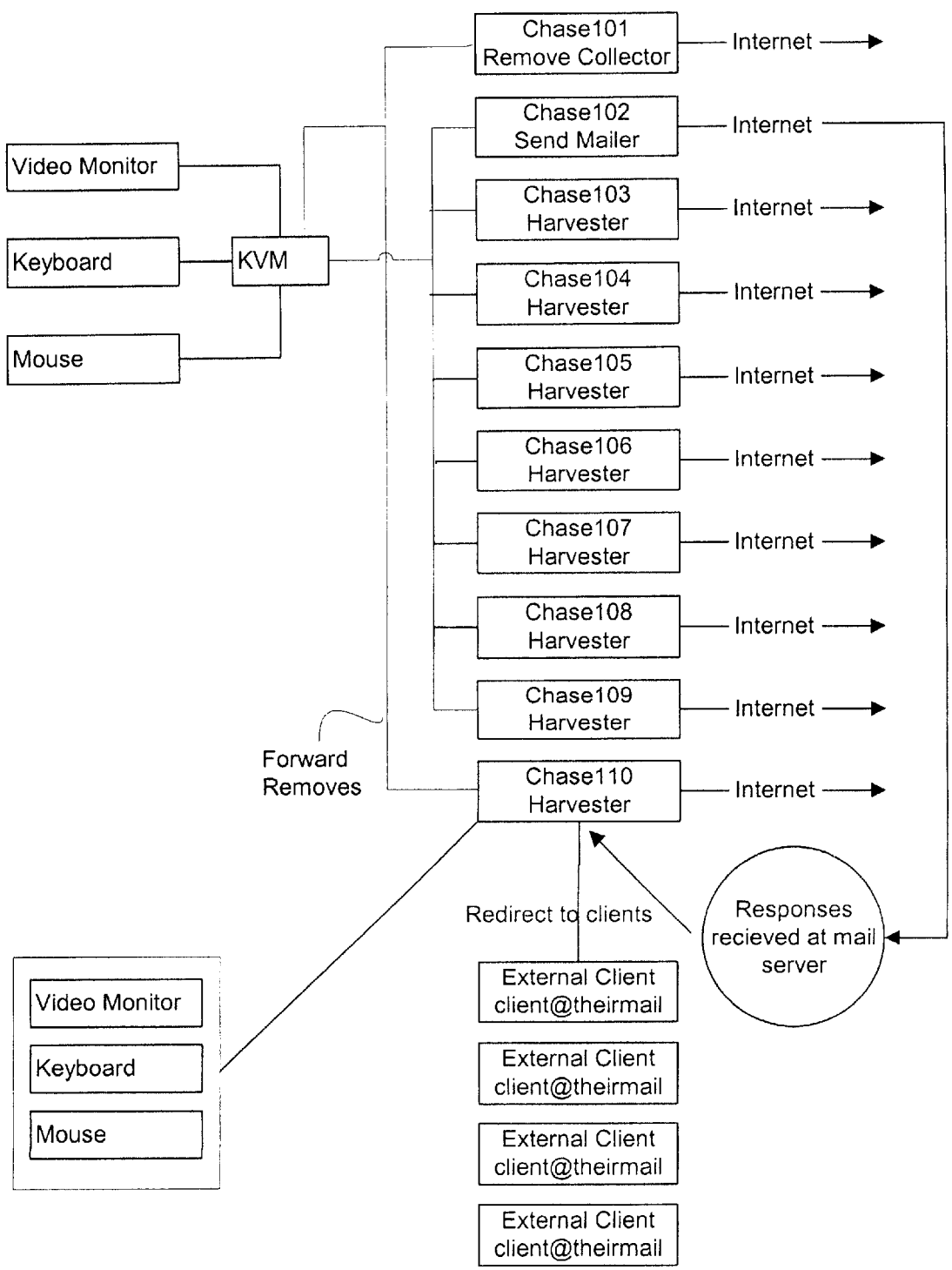
FIG. 1 is an overview of a computer local area network suitable for practicing my invention.

The Candidate Chaser machine automatically locates Internet site pages and web postings which contain operator specified keywords or Boolean combinations and then extracts all email addresses from those pages as well as linked pages to as many linking levels as selected by the operator and then sends a job opportunity description enclosed in an electronic mail message to each of the extracted addresses then receives responses from recipients of the job opportunity message then filters those messages by reading their text and forwards only desirable responses to the candidate seeking client's electronic mail address thusly sparing the client interaction with large amounts of irrelevant response while presenting viable candidates for a given job opening.

The Candidate Chaser machine operator inputs keywords then commands the Candidate Chaser machine to interact with the infinite number of interface possibilities available on the Internet. The operator is not required to conduct or observe the cumbersome, tedious, frustrating and agonizingly slow task of reviewing data contained on Internet web sites, newsgroup postings and other data sources that may exist from time to time on the net. Once started the Candidate Chaser machine conducts the Internet search without operator intervention.

The Candidate Chaser process does not use a static database as its source of addresses but instead takes advantage of the dynamic properties of the Internet where new information is added every minute somewhere on the planet. Candidate Chaser does this by reading internet sites online and extracting email addresses as they appear on targeted sites, postings and broadcasts just prior to broadcasting a job opportunity advertisement Job opportunity announcements are communicated to potential candidates within hours.

Candidate Chaser job opportunity advertisements are delivered directly to the worker's email box therefore she/he is not required to search for applicable job offerings.

Workers view the Candidate Chaser job opportunity advertisement by choice at their convenience any time night or day since the advertisement arrives and resides in the email message box until they take an action or their software automatically discards it based on their previously set filters.

Job opportunity advertisements broadcast by Candidate Chaser stimulate workers to consider new career opportunities even when they are not actively seeking new employment thusly expanding the universe of candidates beyond those available to the employer through passive advertising methodologies.

Specific job opportunity ads are only broadcast to specifically applicable individuals who made their email addresses available on their resumes, on web pages indicating subject matter related to the job opening or on new group postings where subjects related to the job opening were specifically discussed.

Individuals adverse to receiving additional job opportunity advertisements easily eliminate their addresses from any potential future mailings by typing "remove" into the message subject heading and executing their mail programs "reply" command.

The customized harvesting of email addresses focused on the specific needs of each job opportunity advertisement individually results in relatively low quantities of advertisements broadcast. And much less broadcast bandwidth waste due to non-applicable recipients.

The Candidate Chaser process costs less per hire to operate than other recruitment methods.

Responses to electronically mailed advertisements are automatically processed through software filters: protecting job opportunity advertisers from "flames", storing removal committed addresses into a universal database, and sorting qualified responses to the appropriate hiring authorities email box.

SUMMARY

The Candidate Chaser process uses a combination of publicly available and proprietary software computer programs and generally available computer hardware and computer peripherals to operate as a single unit as a means to harvest email addresses of specifically targeted individuals based on their work experiences and interests, then broadcasts a job opportunity advertisement to the recipients at the harvested addresses and then appropriately sorts and redirects consequential response to remove databases, or to quality control functions or to clients' electronic mail addresses and deletes responses from the virtual mail server.

Figure 2:
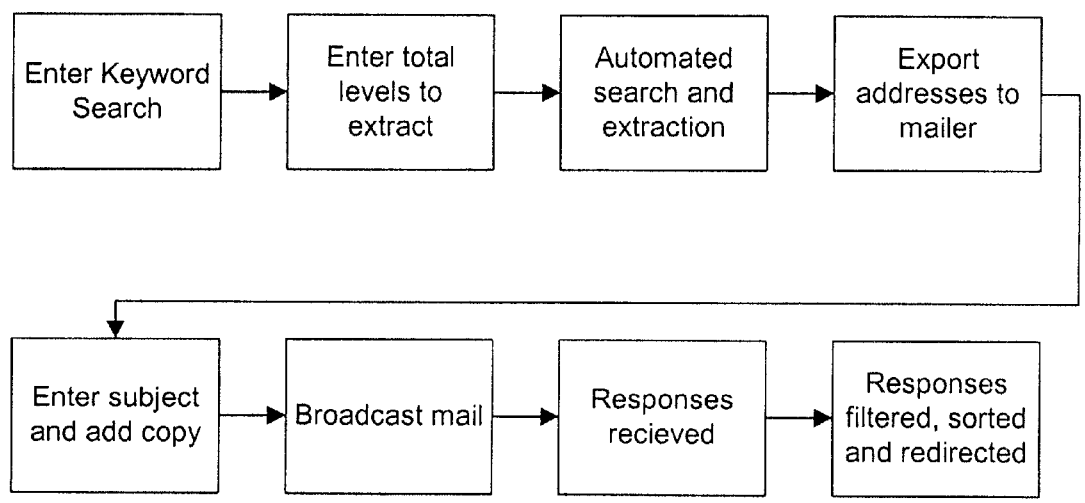
FIG. 2 is an overview of an alternative computer system suitable for practicing my invention, where a local area network is optional.

DESCRIPTION FIG. 1 and FIG. 2

The Candidate Chaser machine hardware description herein is for illustration purposes only. It should be noted that the number of general purpose computer processors and the method for interfacing them, for example KVM's (Keyboard, Video, Mouse switch) used, may vary depending on the required capacity and improvements in hardware available. Factors that would affect required capacity include but are not limited to the number of outgoing mailings projected on a daily basis, the size of the address collection lists to which the messages will be directed, the frequency of mailings and the number of responses expected.

While the number of general purpose computer processors included in a single Candidate Chaser unit may be increased, perhaps infinitely, the unit always requires at least one general purpose computer processor unit. The Candidate Chaser machine unit always requires the same types of software working in combination as described herein as the candidate chaser process.

The first Candidate Chaser unit constructed and described herein was assembled from single general purpose computers installed with the Windows 95 Operating System.

Systems other than Windows 95 could be used to conduct the candidate chaser process. Other widely accepted operating system platform such as Unix, OS2, and Macintosh as well as any operating system platforms that may come available from time to time could be used provided they meet the ability to allow for the operation of computer software programs necessary to the outcome of the Candidate Chaser process.

The Candidate Chaser machine presently in operation consists of ten general purpose computers manufactured by the Compaq computer company each equipped with a 150 mhz pentium processors by Intel, 24 megabytes of ram, a 1.4 gigabyte hard-drives and 28.8 k internal modem. The units are stacked together one on top of the other, held together by a computer rack that is attached to a platform with four sets of swiveling wheels. Attached to the rack above the ten general purpose computer processors are two video monitors one placed above the other. The computer monitors are also manufactured by Compaq computer company. Above the monitors are three switches commonly known as KVM's manufactured by a company called Belkin which are used to switch the keyboard and monitor and mouse interfaces from one general purpose computer to another. The purpose of the KVM configuration is to reduce the need for monitors, mouse's, and keyboards. The operator of the Candidate Chaser machine unit and process requires the use of a monitor and keyboard to interface with the individual general purpose computers only at certain times during the process. Therefore, it is not necessary to have a number of keyboards mice, and monitors equal to the number of general purpose computers.

Specialized cabling connects the computers to the KVM switches and the KVM switches to the monitors, mice, and keyboards. The RJ11 modem ports are connected by cable to ten separate telephone trunk lines installed by the telephone company on the walls of the facility where the Candidate Chaser machine is operated.

A substitute for the modem connections could be a network connection, such as ethernet, to a router and subsequent ISDN, T1 or fraction thereof, T3 or fraction thereof, or any other telecommunication link to the Internet that may be available.

Attached to the front of the Candidate Chaser machine is a platform that is approximately 36 inches by 12 inches providing a flat surface on which the two keyboards and two mice can rest. The platform is attached to a swivel mechanism so the keyboard height may be adjusted for the comfort of the Candidate Chaser machine and process operator.

To provide for a means of organized reference and procedure manuals, during communication regarding the process and descriptions the individual general purpose computers are labeled as follows: chaser 101, chaser 102, chaser 103, chaser 104, chaser 105, chaser 106, chaser 107, chaser 108, chaser 109, chaser 110.

Chaser 101 is used to receive mail forwarded from chaser 110. Chaser 110 forwards certain pieces of received mail to chaser 101 so that a program installed on chaser 101 can extract the address from the any received message then store the address in a text file so that it may be imported at another time into a file labeled the "remove file" that is referred to later in the process. Chaser 101 is programmed to use an Internet connection to a mail server so it may download electronic mail messages sent to said server by chaser 110. A software computer program called "Replyman" manufactured by ExtractorPro (see Prior Art Document #7) is installed on chaser 101 and serves the purpose to extract the addresses from the downloaded messages and store them into a text file. It is not required that the software "Replyman" be used to execute this process. A programmer experienced in this technology could write a simple program to perform this task using any of an assortment of language compilers such as C, Basic, Assembler, or Cobol.

Chaser 102 is configured to establish a connection with a server providing smtp access for the purpose of delivering electronic mail. A software program called "ExtractorPro Mailer" is installed for the purpose of importing data from text files created by the other chaser harvesting units which are installed on chaser 103, 104, 105, 106, 107, 108, 109. Chaser 102 is equipped with the mailing program so that it may import the addresses from the text files, provide for the compilation of a job opportunity advertising message, a subject and a from field. The software also completes the broadcast of the message to all the extracted addresses through a smtp channel or multiple smtp channels over the Internet. In addition to ExtractorPro mailing program there are similar computer software programs available to accomplish the same purpose as ExtractorPro's. Those computer programs included but are not limited to computer software packages called Mach10, Stealth, and NetContact. The capabilities and details regarding these computer software programs are included in the Prior Art Documents attached to this application. Chaser units 103, 104, 105, 106, 107, 108, and 109 are installed with computer program software called "WebWeasel" which is described in the attached Prior Art Document #7. Based on operator commands, the WebWeasel software executes a search of the Internet seeking web sites that contain the keywords entered by the Candidate Chaser Machine and Process operator and then download the text of the discovered web sites into the memory of the general purpose computer and then compare the text of the web site to an algorythm that recognizes a combination of characters which represent an electronic mail address and then store the electronic mail addresses into a database or text list for export to the mailing broadcast computer software at a later stage in the process. The Candidate Chaser Machine must be installed with computer software program that will enable it to search for web sites containing operator entered keywords and extract electronic mail addresses from the discovered web sites. It is not necessary for a Candidate Chaser Machine to be equipped with "WebWeasel" computer software. There are other computer software programs available including but not limited to: Sonic, Web Collector, and Net Contact which are described in the Prior Art Documents attached to this application.

OPERATION AND PROCESS DESCRIPTION
FIG. 1 and FIG. 2

The typical Candidate Chaser machine consists of one or more general purpose computers equipped with microprocessor, ram, hard disk drive, a communication interface that links the computer(s) to the Internet, one or more keyboards and mouse interface, one or more monitors, and software to be described later. If one monitor is used with multiple computers then a KVM keyboard mouse monitor switch box is employed so operator may switch monitor and keyboard interfaces between computers.

The general purpose computers are physically connected to a network router that can consist of simple analog modems connected to simple telephone lines or more complex digital routing methods but in all cases access to the Internet is necessary.

Installed commercially available "offline browsing" computer software enables the operator to instruct the machine to locate websites and postings, accessed via the internet, which contain operator specified keywords or Boolean combinations and then to download and store the address of the located matching websites and postings into memory. The address is in the format of the URL (Universal Resource Locator)or other address indicator protocols used on the Internet. The machine immediately or at another time downloads the text from the files at the addresses which were located and stored in memory.

The keywords and Boolean combinations entered into the machine should be closely related to the experiences, interests, capabilities, professional titles or talents desired in applicable job candidates.

The operator may instruct the machine to locate Hyper Text Markup Language Links, which are embedded addresses to other files on the Internet, on any of the website pages or postings turned up by the search. The operator may instruct the machine to follow the Links to their respective sites and locate more links at those sites. The operator may instruct the machine to follow the links as many level as desired. The number of link levels to search are determined by the focus required of the collection of addresses sought.

Once the text of a site or posting is downloaded the machine searches the text of the downloaded file for character strings representative of electronic mail addresses and saves those addresses in memory or disk storage. Presently, the electronic mailing protocol dictates that a filtering algorithm be used as follows: extract any string of characters that fits "space"_*@*.*_"space" where "*" is a wildcard variable representing any combination of characters.

The machine continues to download and store site and posting addresses and download and store text into memory and extract addresses without continued operator action until all applicable extractions are completed or the operator instructs the machine to stop.

Collections of addresses may be stored in separate electronic storage files for repeated retrieval at later times.

Since the collected addresses are extracted from sites and postings containing the specified keywords or Boolean combinations, it is reasonable to predict that a consequential number of those addresses will belong to individuals with experiences, interests, capabilities, professional titles or talents related to those keywords or Boolean combinations.

Installed commercially available electronic mailing computer software enables the operator to instruct the machine to deliver a specific job opportunity advertising message to each address collected into a specific file. The operator types the copy into the machine keyboard interface and then instructs the machine to send the message to a specific collection of addresses at a specified time.

Each message has a "From" field and a "Reply to:" field in addition to others. When electronic mail messages are received, recipients look to the "From" and "Reply to:" fields for instructions relating to sending response messages. The operator of the Candidate Chaser machine and process may insert any electronic mail address into the "From" and "Reply to:" fields as she/he may desire. The Candidate Chaser machine is designed to handle many mailings at one time and could be used to serve multiple candidate seeking hiring clients. In the case of multiple clients, the "From" and "Reply to:" fields could contain the electronic mail address of the client for each given job opportunity message. Thus, each client would receive response to their message directly.

There are reasons why the operator of the Candidate Chaser machine might want to filter responses before received by the client. First, a significant percentage of the response is error messages due to the fact electronic mail addresses are terminated often without forwarding instructions. Second, a percentage of responses are requests to be removed from future mailings. Third, a significant percentage of messages are "thanks but no thanks but keep me notified of other stuff" responses. Fourth, a percentage of responses are notifications that the recipient is forwarding the message to someone that might be more interested. Fifth, only a small percentage of responses are from candidates that are interested in applying for the job.

In order to filter responses before they are directed to the client's electronic mail address the following procedure is used: A domain name is registered with InterNIC and the IP address location of a virtual mail server is designated. The virtual mail server is programmed to deliver all mail to one user logon at a specified POP3channel. A single "Virtual Mail Server" (VMS) can be maintained on an Internet Service Provider (ISP) host for each Candidate Chaser machine or on a private server. The VMS is designated by a domain name registered with Internic, for example "abcd123.com". Candidate Chaser clients are assigned Mail Accounts to the domain by the Candidate Chaser machine operator, for example 1001@abcd123.com. A Master User Name (MUN) for the domain on the VMS, for example smr@abcd123.com, programmed to download all mail received into the account no matter what the prefix, is programmed into the server. Electronic mail messages to potential candidates contain the client's assigned VMS mail account in the "Reply" field so that responses are directed to the domain and received into the virtual mail server's storage. Consequently, the "To;" field in the response message contains the client's mailing account address at the Candidate Chaser virtual mail server domain. Mail, directed to different clients based on the address in the "To:" field, is downloaded from the VMS in a single COMBINED batch using the mail computer software program to accessing the MUN account. The mail program filters and redirects the electronic mail message based on the filters and filter actions listed in the paragraphs that follow.

Mail containing spam complaints or requesting removal from lists are directed to the Candidate Chaser machine's remove list creating computer software program, which presently is ExtractorPro Reply Man but can be any similar performing software package, so the addresses are automatically added to the Candidate Chaser machine's remove list and NOT forwarded to the client. Error messages indicating non-deliverable messages are deleted and NOT forwarded to clients.

Messages containing resumes and curriculum vitae are forwarded to a designated resume collection electronic mail address. Any messages that were not forwarded to the remove site or deleted for non-delivery are forwarded to the client's personal mail address at their mail server, for example: sally@aol.com. Mail that doesn't match any filter is forwarded to the quality control staffs' mail address so they can inspect it and determine whether filters need adjustment.

Filters are set up using the "Filters" command language of any commercially available filter capable mailing computer software program. The following filter program is designed for a Candidate Chaser machine using ten general purpose computers where the computers are referenced by a sequencial labeling system with the labels as follows: Chase101, Chase102, Chase103, Chase104, Chase105, Chase106, Chase107, Chase108, Chase109, Chase110, where the unit referenced as Chase101 receives messages containing electronic mail addresses designated for addition the remove list
1. Checking Mail option=leave mail on server (Mail will be removed from server by filter actions only.)
2. Every filter is programmed to execute on "incoming" mail only.
   2.1. Filters
      2.1.1. Removes to Chase101
         2.1.1.1. Subject contains "remove" or "spam" action equals make subject "Remove" then action equals redirect to chase101@domain.com then server option equals "delete" then action equals "Skip Rest".
         2.1.1.2. Subject contains "unsubscribe" or "junk" action equals make subject "Remove" then action equals redirect to chase101@domain.com then server option equals "delete" then action equals "Skip Rest".

2.1.1.3. Subject contains "garbage" or "trash" action equals make subject "Remove" then action equals redirect to chase101@domain.com then server option equals "delete" then action equals "Skip Rest".

2.1.1.4. Body contains "remove" or "spam" action equals make subject "Remove" then action equals redirect to chase101@domain.com then server option equals "delete" then action equals "Skip Rest".

2.1.1.5. Body contains "garbage" or "trash" action equals make subject "Remove" then action equals redirect to chase101@domain.com then server option equals "delete" then action equals "Skip Rest".

2.1.2. Undeliverables Deleted 2.1.2.1. Subject contains "deliver" or "error" then action equals server option "delete" then "Skip Rest"

2.1.2.2. Subject contains "unknown" or "bad" then action equals server option "delete" then "Skip Rest"

2.1.2.3. Subject contains "illegal" or "fail" then action equals server option "delete" then "Skip Rest"

2.1.3. Resume attached 2.1.3.1. Subject contains "resume" or "vitae" then action equals redirect to resume@domain.com 2.1.3.2. Body contains "resume" or "vitae" then action equals redirect to resume@domain.com 2.1.4. Forward to customer everything not deleted and matching their address 2.1.4.1. To contains XXX@abcd123.com then action equals redirect to user@theirdomain.com and server option equals delete and action equals "Skip Rest" Notice: every client requires one of these filters 2.1.5. Forward non filtered items to Quality Control Person—Theoretically nothing should be available to filter and forward to the Quality Control Function at this point unless there is a filter programming oversight.

2.1.5.1. To "appears" then redirect to qc@qcdomaine.com then server option equals delete and "Skip Rest"

Each Candidate Chaser machine is designated its own Master User Name at a Virtual Mail Server where a domain name specific to each machine is registered, for example "abcd123.com". ALL mail sent to any variation of XXX@abcd123.com, where XXX represents any designated client address assigned to that domain, is downloaded in one batch to the mail processing computer software program by accessing the assigned user name via the assigned POP3 channel. For example the user "SMR" may download all mail sent to the domain "abcd123.com" through the POP "mailhost.yourisp.net". In this case the ISP maintains the server on its domain called "mailhost.your-isp.net". Often the ISP will use the MUN domain as the POP3 channel so that it is possible to download the mail using a user name such as "SMR" through the POP3 channel "abcd123.com" or whatever other domain name is assigned by the ISP.

The ISP that provides the Virtual Mail Server is not necessarily the provider of dial-up access to the server. Therefore, one might dial-up the internet using one ISP such as Netcom to get onto the Internet Backbone and then access the Virtual Mailserver at a different ISP. The DNS settings in the dial-up program (usually entered in the TCP/IP settings of the dial-up) can be from one ISP while the POP3 settings can be from another.

CONCLUSION, RAMIFICATIONS, AND SCOPE

Accordingly, the reader will see that the Candidate Chaser Machine and Process automatically locates Internet site pages and web postings which contain operator specified keywords or Boolean combinations and then extracts all email addresses from those pages as well as linked pages to as many linking levels as selected by the operator and then sends a job opportunity description enclosed in an electronic mail message to each of the extracted addresses then receives responses from recipients of the job opportunity message then filters those messages by reading their text and forwards only desirable responses to the candidate seeking client's electronic mail address thusly sparing the client interaction with large amounts of irrelevant response while presenting viable candidates for a given job opening.

The Candidate Chaser process does not use a static database as its source of addresses but instead takes advantage of the dynamic properties of the Internet where new information is added every minute.

Job opportunity announcements are communicated to potential candidates within hours of submission.

Candidate Chaser job opportunity advertisements are delivered directly to the worker's email box therefore she/he is not required to search for applicable job offerings.

Workers view the Candidate Chaser job opportunity advertisement by choice at their convenience any time night or day since the advertisement arrives and resides in the email message box until they take an action or their software automatically discards it based on their previously set filters.

Job opportunity advertisements broadcast by Candidate Chaser stimulate workers to consider new career opportunities even when they are not actively seeking new employment thusly expanding the universe of candidates beyond those available to the employer through passive advertising methodologies.

Specific job opportunity ads are only broadcast to specifically applicable individuals who made their email addresses available on their resumes, on web pages indicating subject matter related to the job opening or on new group postings where subjects related to the job opening were specifically discussed.

Individuals adverse to receiving additional job opportunity advertisements easily eliminate their addresses from any potential future mailings by typing "remove" into the message subject heading and executing their mail programs "reply" command.

The customized harvesting of email addresses focused on the specific needs of each job opportunity advertisement individually results in relatively low quantities of advertisements broadcast and therefore, much less broadcast bandwidth is wasted due to non-applicable recipients.

The Candidate Chaser process costs less per hire to operate than many other recruitment methods.

Responses to electronically mailed advertisements are automatically processed through software filters presenting job opportunity advertisers with responses from interested candidates only.

The scope of this invention is limited to operating the combination of types of computer hardware, types of telecomunication hardware, and types of computer software programs and their operation in a specified manner as described herein consistent with achieving the objectives of the process set forth herein. Although the description above contains many specificities, these should not be construed as limiting the scope of invention but as merely providing illustrations of the presently preferred embodiments of this invention. For example, the search for web sites containing operator specified keywords may be executed using computer software programs not yet designed, created or available instead of the computer software program listed in the description.

Thus the scope of the invention should be determined by the appended claims and their legal equivalents, rather than by the examples given.

I claim:

1. A computer-implemented method comprising—performing the following steps in the following sequence:
    a. searching the Internet
    b. locating an Internet page or web posting,
    c. reading at least a part of the text of said Internet page or web posting
    d. comparing said text against at least one user defined criteria for an individual with specifically defined professional qualifications,
    e. sorting said Internet page or web posting according to the presence or absence of said user defined criteria and for Internet site pages or web postings meeting said user defined criteria, electronically extracting from said Internet site page or web posting an e-mail address, and
    f. sending to said extracted e-mail address an electronic mail message.

2. The method of claim 1, wherein said reading comprises reading substantially all of said text.

3. The method of claim 1, wherein said comparing step is performed by comparing said text to an operator specified keyword or Boolean combination.

4. The method of claim 1, wherein said comparing step is performed using a rules based technology (such as natural language screening).

5. The method of claim 1, wherein said user defined criteria for an individual with specifically defined professional qualifications, comprises at least one rule to identify whether said text comprises a resume for a potentially appropriate candidate.

6. The method of claim 1, wherein said user defined criteria for an individual with specifically defined professional qualifications, comprise previous candidate search results.

7. The method of claim 1, wherein said sorting comprises calculating a "score" for said Internet page or web posting and ranking said Internet page or web posting by said score.

8. The method of claim 1, wherein said user defined criteria for an individual with specifically defined professional qualifications, comprises at least one rule to identify whether said text comprises a resume for a potentially appropriate candidate; and wherein said sorting comprises calculating a "score" for said Internet page or web posting and ranking said Internet page or web posting by said score.

9. The method of claim 1, wherein said sorting generates a score for said Internet page or web posting, said score enabling said Internet page or web posting to be ranked by score; and wherein said sending is done only if said score satisfies a threshold value.

10. The method of claim 1, wherein said electronic mail message comprises information on the potential availability of a job opportunity.

11. The method of claim 1, wherein said method is made available to a customer on a subscription basis for direct access by said customer over the Internet via a standard Web browser.

12. The method of claim 11, further comprising:
    g. receiving at least one response to said electronic mail message.

13. The method of claim 12, further comprising:
    h. analyzing said response according to at least one user defined relevancy criteria to identify whether said response is desirable.

14. The method of claim 13, further comprising:
    i. forwarding said response to a client.

15. The method of claim 14, wherein said response is forwarded to said client only if said response meets said relevancy criteria.

* * * * *